United States Patent
Tomasko et al.

(10) Patent No.: US 10,527,184 B2
(45) Date of Patent: Jan. 7, 2020

(54) BUCKLING PIN VALVE

(75) Inventors: John Tomasko, Limerick (IE);
Geoffrey Brazier, Woodbury, MN (US); Tiago Martins, Sao Paulo SP (BR); Sirish Bhaskar, Chennai (IN)

(73) Assignee: BS&B Safety Systems Limited, Limerick (IE)

( * ) Notice: Subject to any disclaimer, the term of this patent is extended or adjusted under 35 U.S.C. 154(b) by 0 days.

(21) Appl. No.: 13/573,200

(22) Filed: Aug. 30, 2012

(65) Prior Publication Data

US 2013/0199622 A1 Aug. 8, 2013

Related U.S. Application Data

(60) Provisional application No. 61/573,095, filed on Aug. 31, 2011.

(51) Int. Cl.
*F16K 17/40* (2006.01)

(52) U.S. Cl.
CPC .................. *F16K 17/406* (2013.01)

(58) Field of Classification Search
CPC ............. F16K 17/406; Y10T 137/0402; Y10T 137/1782
USPC ................ 137/70, 71, 68.11, 15.18
See application file for complete search history.

(56) References Cited

U.S. PATENT DOCUMENTS

| | | |
|---|---|---|
| 3,511,270 A | 5/1970 | Fehrenbach et al. |
| 3,810,484 A | 5/1974 | Martini |
| 4,201,366 A | 5/1980 | Danko et al. |
| 4,274,435 A | 6/1981 | Block |
| 5,144,973 A | 9/1992 | Green et al. |
| 5,273,065 A | 12/1993 | Taylor |
| 5,348,039 A * | 9/1994 | Taylor et al. .................. 137/70 |
| 5,511,581 A | 4/1996 | Ligh |
| 5,577,523 A * | 11/1996 | Taylor ...................... 137/15.18 |
| 5,577,524 A | 11/1996 | Taylor |
| 5,727,586 A | 3/1998 | Taylor |
| 5,738,333 A | 4/1998 | Cognevich et al. |

(Continued)

OTHER PUBLICATIONS

Kurt Gramoll, *Eccentric Loads & Secant Formula: Theory*, Mechanics Ebook, last accessed Apr. 26, 2013, available at http:// http://ecourses.ou.edu/cgi-bin/ebook.cgi?doc-&topic=me&chap_sec=09.3&page=theory (4 pages).

(Continued)

*Primary Examiner* — Umashankar Venkatesan
(74) *Attorney, Agent, or Firm* — Finnegan, Henderson, Farabow, Garrett & Dunner, LLP

(57) ABSTRACT

A buckling pin valve and associated methods are disclosed. More specifically, a buckling pin valve is disclosed with a valve body having an inlet and an outlet, a valve seat at the valve body inlet, a valve plug configured to sealingly engage with the valve seat, a pin cage attached to the valve body and configured to mount a buckling pin, and a shaft configured to transfer forces from the valve plug to the buckling pin. A buckling pin valve also is disclosed with a pin cage being made of a rigid all-in-one construction. A method of manufacturing a pin cage for a buckling pin actuated valve is disclosed, wherein the method comprises fabricating a pin cage from a single piece of metal. A method of manufacturing a buckling pin actuated valve also is disclosed.

24 Claims, 9 Drawing Sheets

(56) References Cited

U.S. PATENT DOCUMENTS

| | | | |
|---|---|---|---|
| 6,325,088 B1 | 12/2001 | Scantlin | |
| 6,484,742 B1* | 11/2002 | Brazier et al. | 137/68.11 |
| 6,488,260 B1 | 12/2002 | Dietz | |
| 6,651,686 B2* | 11/2003 | Scantlin | G05D 16/18 137/461 |
| 8,474,480 B1* | 7/2013 | Scantlin | 137/488 |
| 2003/0047214 A1 | 3/2003 | Scantlin | |
| 2004/0154466 A1 | 8/2004 | Gethmann et al. | |
| 2005/0040284 A1 | 2/2005 | Christensen et al. | |
| 2005/0236594 A1 | 10/2005 | Lilly et al. | |
| 2007/0056629 A1 | 3/2007 | Klein | |

OTHER PUBLICATIONS

Int'l Search Rep. and Written Op. in Int'l App. No. PCT/US2012/053118 (dated Nov. 30, 2012) (14 pages).

Office Action, Chinese Application No. 2012800415742 (dated Jan. 6, 2017) (5 pages), with English-language translation (8 pages) (13 pages total).

\* cited by examiner

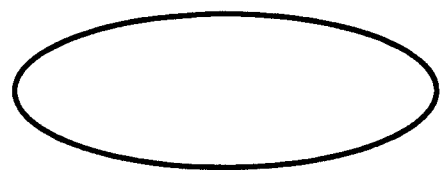
FIG. 3C
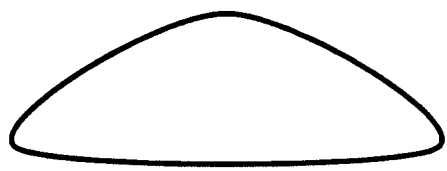     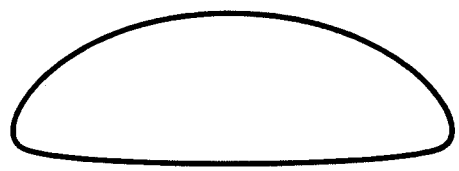
FIG. 3D          FIG. 3E
FIG. 3F

BUCKLING PIN VALVE

CROSS-REFERENCE TO RELATED APPLICATIONS

This application claims the benefit of U.S. Provisional Application No. 61/573,095, filed Aug. 31, 2011, by John Tomasko et al. and titled BUCKLING PIN VALVE, the disclosure of which is expressly incorporated herein by reference.

FIELD OF THE DISCLOSURE

This disclosure generally relates to buckling-pin actuated valves ("BPAV") with improved performance and reliability.

BACKGROUND

There are many types of systems that process, transport, or use a pressurized fluid. To ensure the safety of these types of systems, each such system typically includes a safety device designed to prevent the over-pressurization of the system. In an emergency situation, where the fluid in the system reaches an unsafe level, the pressure of the fluid acts on the safety device to create an opening to release fluid from the system. Venting fluid to the environment or a safety reservoir through the opening reduces the pressure in the system and prevents another portion of the system from failing due to the high pressure of the fluid. Examples of known safety devices are disclosed in co-owned U.S. patent application Ser. No. 11/221,856, published on Mar. 15, 2007, as U.S. Patent Pub. No. US 2007/0056629 A1, the entire contents of which are incorporated herein by reference.

One specific type of safety device for a pressurized system is a pressure relief valve, which may be a reclosing valve or a non-reclosing valve. Typically, a spring, a pin, or a combination of a spring and pin, is used to hold a moving plug in sealing engagement with the housing of the device while connected to the pressurized system. When the pressure of the fluid reaches the predetermined safety level in such systems, the force exerted on the plug by the pressurized fluid overcomes the bias of the spring or exceeds the resistance of the pin that holds the plug in place. When either of these events occurs, the pressurized fluid moves the plug to expose an opening through which fluid may escape to relieve the pressure in the system. Reclosing valves will automatically reset once the pressurized fluid at the inlet of the device has reduced sufficiently for the spring or other mechanism to reseat the plug. Non-reclosing valves require that the device be manually reset so that the valve plug is re-engaged with the seat and, if necessary, the pin or other expendable component replaced.

As noted above, relief valves are known that use buckling pins, or breaking pins, to hold a sealing plug in sealing engagement to block the flow of a pressurized fluid. Such a relief valve may be referred to as a buckling pin actuated valve, or "BPAV." A known BPAV is disclosed in U.S. Pat. Nos. 5,273,065, 5,577,524, and 5,727,586. The pin release device prevents the plug from venting pressurized fluid until the output force exceeds a predetermined limit. Prior release devices have included a pin that is subject to a compressive force. A pin subject to compressive force is designed to buckle according to Euler's Law when the output force reaches the predetermined limit. To perform according to Euler's Law, a compressive-force buckling pin must be loaded along its length axis. If non-axial loading occurs, then the force required to buckle the pin is reduced, leading to unwanted or premature pin activation. Accordingly, proper alignment of a compressive-force buckling pin is desirable. A pin may also be subject to a shearing or tensile force. Such a pin may break when the output force reaches the predetermined limit. Such a device typically may be termed a "Buckling Pin Non Reclosing Pressure Relief Device." In this specification, the "failure" of a buckling pin correlates with "activation" of a buckling pin valve, and the terms may be used interchangeably to refer to the condition in which the buckling pin deforms and/or breaks and the valve allows fluid to flow.

Buckling pins are carefully manufactured components configured to buckle at a particular predetermined compressive force. Breaking pins are carefully manufactured components configured to fail at a particular predetermined tensile or shear force. Such pins used for a pressure relief valve require considerable care and control during installation. Maintenance personnel must ensure that the pin is properly secured and tightened to properly bear the pressure exerted on the pressure relief valve. Failure to do so may result in untimely opening of the valve. A premature opening below the predetermined safety level leads to an unwanted downtime for the system, while a delayed opening above the predetermined safety level jeopardizes the physical integrity of the system. Another problem with a bare pin is that there is a risk of pin damage stemming from maintenance personnel having to contact the bare pin during installation or maintenance. This risk of pin damage is especially high for a fragile, low pressure bare pin.

As noted above, in order to properly function as a safety pressure relief device, it is important that the relief device vents at, or close to, the set pressure. Since buckling pins are designed to buckle at a predetermined compressive force, a pressure relief system must assure that force from the pressurized system is efficiently transferred to the buckling pin. In prior devices, forces from the pressurized system are often improperly transferred through the pressure relief device's structural system such that the compressive force experienced by the buckling pin is not an accurate representation of the actual force transmitted by the pressurized system. For example, forces transferred to the buckling pin from the pressurized system are often lost due to bending, friction between moving parts, misalignment, and moments generated along the path of transmitted force.

In some pressure relief devices, and particularly those having a low set pressure, mishandling and improper installation of the underlying buckling pin can interfere with the accuracy of the set pressure of the device. For example, buckling pins can be dangerously overloaded during the pre-assembly and installation process such that the pin activates at a much lower pressure than desired during use.

There is a need for a BPAV that achieves increased accuracy and reliability. The BPAV of the present disclosure achieves these, or other, advantages.

BRIEF SUMMARY

To attain one or more of the above or other advantages, as embodied and broadly described herein, the disclosure is directed to a buckling pin actuated valve comprising a valve body having an inlet and an outlet, a valve seat at the valve body inlet, and a valve plug configured to sealingly engage with the valve seat. A pin cage having at least one post is attached to the valve body and configured to mount a buckling pin. A shaft is configured to transfer forces from the valve plug to the buckling pin.

The disclosure is further directed to a buckling pin actuated valve comprising a valve body. A pin cage is attached to the valve body, the pin cage being made of a rigid all-in-one construction, and wherein the pin cage is configured to receive a buckling pin cartridge.

The disclosure also is directed to a method of manufacturing a pin cage for a buckling pin actuated valve. The method comprises fabricating a pin cage from a single piece of material, wherein the pin cage comprises an upper plate and a lower plate. The method further comprises machining an upper buckling pin holding location in the upper plate simultaneously with machining a lower buckling pin holding location in the lower plate.

The disclosure is still further directed to a method of manufacturing a buckling pin actuated valve, the method comprising providing a valve body having an inlet and an outlet and attaching a valve seat to the valve body at the inlet of the valve body, positioning a valve plug to sealingly engage with the valve seat, and attaching a pin cage to the valve body. The method further comprises providing a shaft configured to transfer forces from the valve plug to a buckling pin.

BRIEF DESCRIPTION OF THE DRAWINGS

The accompanying drawings, which are incorporated in and constitute a part of this specification, illustrate several embodiments and together with the description, serve to explain principles of the disclosure.

FIG. 1 also shows an energy absorber or cushion. FIG. 1 also depicts a piston seal valve plug.

FIG. 2 also shows an energy absorber or cushion. FIG. 2 also depicts a piston seal valve plug.

FIGS. 3C-3F depict various cross-sections for a post for a pin cage of a buckling pin actuated valve.

FIG. 5 also depicts an all-in-one pin cage.

FIG. 7 also depicts a piston seal valve plug.

DESCRIPTION OF THE EMBODIMENTS

Reference will now be made in detail to the present exemplary embodiments, examples of which are illustrated in the accompanying drawings.

Figure 1:
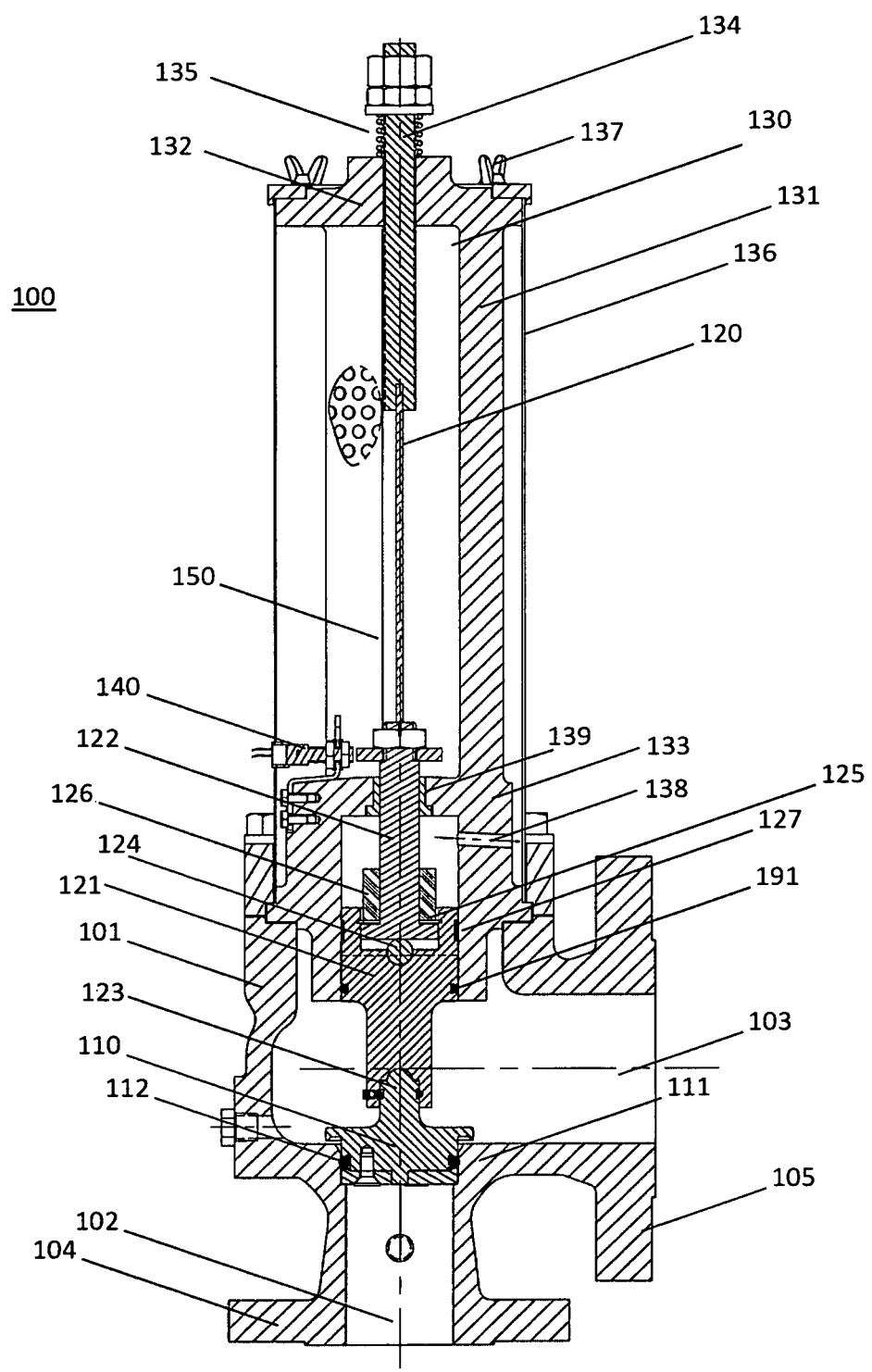
FIG. 1 shows a cross-sectional drawing of a buckling pin valve having an integral valve seat.

As shown in FIG. 1, a BPAV 100 may be provided with a valve body 101, which defines an inlet 102 and an outlet 103. The valve body 101 may be configured to allow a fluid to pass from the inlet 102 to the outlet 103. An inlet flange 104 may be provided at the inlet 102, which may be used to connect the BPAV 100 to a pipe flange or other interface with a pressurized or pressurizable system (collectively, a "pressure system"). An outlet flange 105 may be provided at the outlet 103 which may be used to connect the BPAV 100 to a pipe flange or other interface with a reservoir, relief tank, or any suitable container or receptacle for fluid to pass from the pressure system through the BPAV 100.

As shown in FIG. 1, a BPAV 100 may also be provided with a valve plug 110. The valve plug 110 may cooperate with a valve plug seat 111 to create a seal at the BPAV's inlet, to prevent fluids from passing out of the pressure system.

Pressure from the pressure system may act on the valve plug 110. In a BPAV 100, the valve plug 110 may transmit forces induced by pressure from the pressure system to a buckling pin 120 by way of a shaft (combination of 110, 121, and 122) (also known as a spindle or stem). The buckling pin 120 may be configured to fail under a predetermined amount of stress, which may correlate to a predetermined amount of pressure acting on the valve plug 110. Failure of the buckling pin 120—which is typically characterized by it permanently losing its shape (e.g., a straight cylindrical shape)—allows the valve plug 110 to move such that a BPAV 100 may release or relieve pressure in the event that the pressure system experiences an overpressure condition.

As shown in FIG. 1, a pin-mounting device or "pin cage" 130 may be mounted on the valve body 101 and include a mechanism to hold a buckling pin in place in a BPAV 100. The pin cage 130 may include a number of posts 131, which may join together an upper pin mounting surface 132 and a lower pin mounting surface 133. The upper pin mounting surface 132 may be configured to receive a set screw or post 134, which may be used to hold a buckling pin 120 in place and/or place a buckling pin 120 into a pre-loaded condition. The set screw or post 134 may operate in conjunction with a spring 135 or other element to position or pre-load the buckling pin 120. A pin cage 130 may be provided with a vent 138 to allow air to escape and/or pressures to equalize as the shaft assembly (110, 121, 122) moves.

In one embodiment according to the present disclosure, for example as illustrated in FIG. 1, a BPAV valve body 101 may be made of an all-in-one or integral construction. For example, a BPAV valve body 101 may be cast.

In a prior art 90-degree-flow-path BPAV, by contrast, the valve body is fabricated by welding and/or by bolting together industry standard individually cast pieces of pipe. A fabricated valve body suffers a number of drawbacks. For example, a fabricated body in a BPAV valve results in a longer dimension from inlet to outlet than allowed by the 90-degree flow path API standard. As a result, known fabricated BPAV valves are not usable in API standard piping installations. For example, known fabricated BPAV valves cannot be used to replace other types of 90-degree flow path valves in a standard API piping existing system.

An all-in-one constructed valve body 101, according to the present disclosure, provides advantages over a fabricated valve body. For example, an all-in-one valve body may be designed to meet the 90-degree API standard. As a result, a BPAV with an all-in-one valve body achieves the desired flow attributes of a 90-degree API standard valve, and can be used interchangeably with other types of 90-degree API standard valves.

In addition, a BPAV 100 with the all-in-one body 101 according to the present disclosure and as illustrated for example in FIG. 1 may also provide advantages over other 90-degree API standard pressure or safety relief valves. API standard valves are typically spring loaded and have defined restrictive inlet orifice diameters that assist in the reclosing of such devices. Because the BPAV 100 is a non-reclosing pressure relief device, there is no requirement to restrict the incoming flow as a component in managing the automatic reclose of the device. This allows the inlet orifice for a BPAV 100 to be freely selected, such as matching the inlet orifice diameter to the nominal pipe size to maximize flow. The BPAV valve may be able to open wider (and provide a better flow path) than other 90-degree API standard valves. In some 90-degree API standard valve systems, the valve is considered a low-flow region (i.e., a bottleneck). Therefore, larger diameter piping systems must be used to allow for such restricted flow. However, because a BPAV valve according to the present disclosure may have improved flow characteristics, smaller diameter piping systems may be used while still achieving the same level of overall fluid flow.

The valve body 101 of a buckling pin valve may be provided with a large inlet diameter to prevent undesirable reduction in cross-sectional area. When a buckling pin valve is activated, fluid must be allowed to pass through the valve out of the system. Any undesirable reduction in cross-sectional area could undesirably decrease fluid flow and delay release of dangerous pressures.

The valve body 101 of a buckling pin valve may be provided with flange faces set a particular distance from the valve. In one embodiment, the faces of both the inlet and outlet flanges 104, 105 may be positioned so as to improve flow through the system but not so far as to waste material. The distance between flange faces may be designed to allow for reduced turbulence through the valve and/or improved flow rate. In addition, the distance between flange faces may be designed to satisfy API code requirements.

In one embodiment, as illustrated in FIG. 1, a BPAV 100 may be provided with a "piston seal" arrangement. In a BPAV having a piston seal arrangement, a valve plug 110 may be configured to fit within a valve seat 111. For example, a cylindrical valve plug 110 may fit within a cylindrical valve plug seat 111 in a piston-cylinder arrangement. It is contemplated that other, non-cylindrical shapes of valve plugs and valve plug seats may also be used in a piston seal arrangement. In addition, one or both of the valve plug and valve plug seat may be provided with a sealing member, such as, for example, a rubber O-ring 112, to enhance the quality of the seal between the valve plug and valve plug seat.

In a prior known BPAV system, a "face seal," rather than a "piston seal" is used. In a face seal arrangement, a valve plug simply seals against or rests on top of the opening of a valve seat—the valve plug does not fit within the valve seat. A face seal may suffer a number of disadvantages. For example, when a buckling pin is close to its set pressure, the buckling pin and/or the shaft may undergo slight elastic bending. Such bending may be enough to allow a face seal to become "unseated" and commence leakage of fluid from a pressure system. As another example, a BPAV shaft may be bent—through activation or manufacturing defects, for example—which may diminish the quality of a face seal and may allow for leakage.

Because a piston seal fits a valve plug 110 within a valve seat 111, a piston seal may maintain a seal for some significant stroke of the valve. Thus, even if the buckling pin 120 or shaft 121 is bent—through damage, under pressure, or for any other reason—and the valve plug 110 is allowed to move slightly, a piston seal may maintain a fluid-tight seal better than a face seal might.

In one embodiment, illustrated in FIG. 1, a BPAV 100 may have a valve plug seat 111 or nozzle (not shown) integral to the valve body 101. An integral valve plug seat 111 or nozzle may be cast as part of the valve body 101 casting. Alternatively, an integral valve plug seat 111 or nozzle may be machined or bored into a valve body 101. An integral valve plug seat 111 or nozzle may provide advantages in terms of manufacturing and may save costs.

Figure 2:
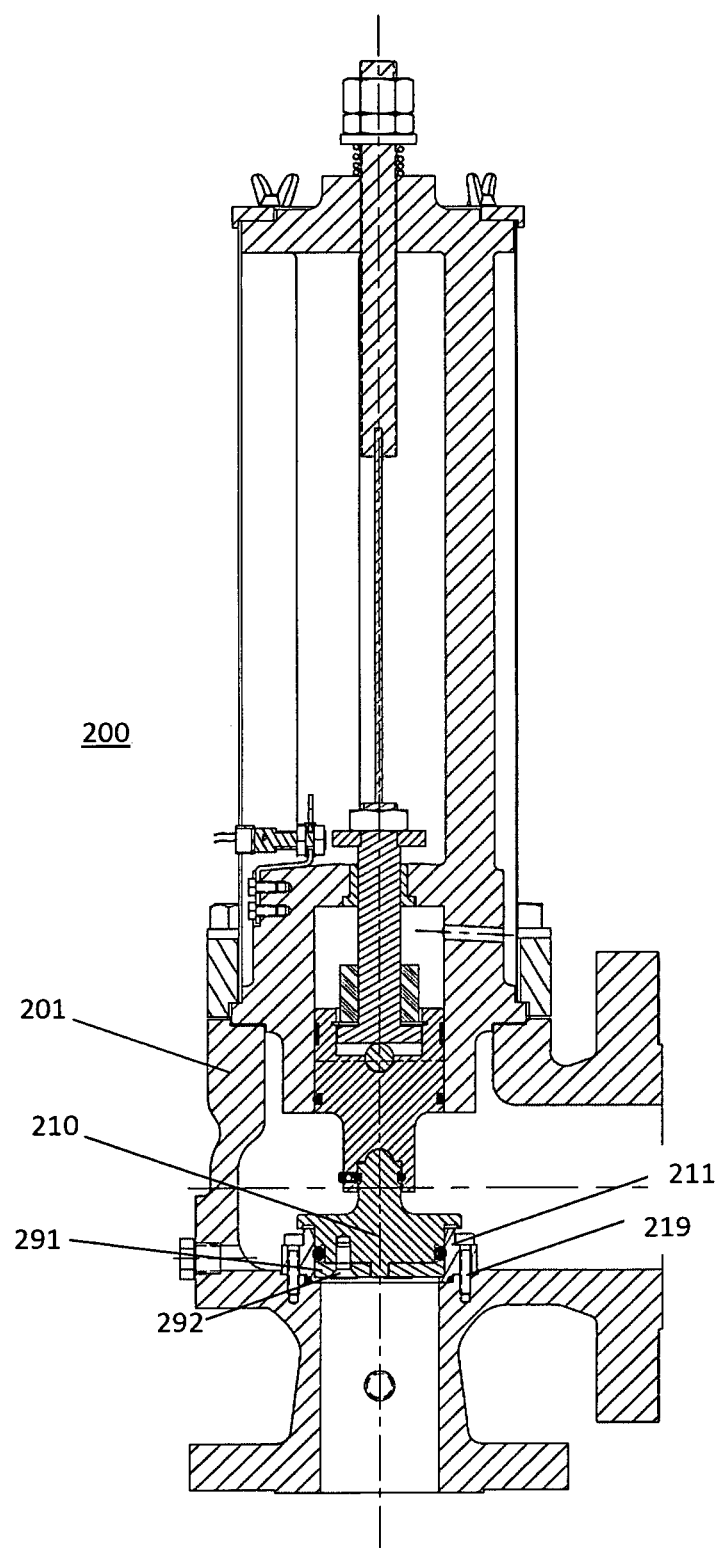
FIG. 2 shows a cross-sectional drawing of a buckling pin valve having a replaceable valve seat.

In another embodiment, illustrated for example in FIG. 2, a BPAV 200 may have a separate, replaceable valve plug seat 211 that is attached to the valve body 201 in a leak-proof manner. As shown in FIG. 2, for example, the replaceable valve plug seat 211 may be attached to the valve body 201 by one or more screws 219. In another embodiment, a replaceable valve plug seat 211 may be attached to the valve body by rivets, adhesives, or any other suitable leak-proof manner. A replaceable valve plug seat 211 may provide advantages. For example, a replaceable valve seat 211 may allow for better sealing after repeated activation of the BPAV 200, by providing better control of surface finish and dimensional tolerance. It may be cheaper or easier to precisely refine a separate valve plug seat 211 than it would be to refine a seat integral to a valve body 201. As another example, a replaceable valve plug seat 211 may allow for the use of more expensive materials in a valve plug seat 211 (such as harder or more damage-resistant materials) without having to use such expensive materials throughout the remainder of the valve body 200. The use of harder materials in the valve seat 211 than those used in the valve body 201 may prevent excessive wearing of the valve body 201. In this way, the use of harder—more expensive—materials may be limited to the valve seat 211, so a softer and less expensive material may be used for the rest of the valve body 201. A replaceable valve plug seat 211 may also provide advantages if the valve plug seat 211 is damaged or worn during installation or operation of the BPAV 200. With a replaceable valve plug seat 211, damaged or worn sealing surfaces may be replaced in the field without replacing or re-machining the entire valve body 201.

As also shown in FIG. 2, a valve plug 210 may have a replaceable plug interface 291. The replaceable plug interface 291 may be attached to the valve plug 210 in a leak-proof manner. As shown in FIG. 2, for example, a replaceable plug interface 291 may be attached to the valve plug 210 by one or more screws 292. In another embodiment, a replaceable plug interface 291 may be attached to the valve plug 210 by rivets, adhesives, or any other suitable leak-proof manner. A replaceable plug interface 291 may provide advantages. For example, a replaceable plug interface 291 may allow for better sealing after repeated activation of the BPAV 200, by providing better control of surface finish and dimensional tolerance. It may be cheaper or easier to precisely refine a separate plug interface 291 than it would be to refine plug interface integral to a valve plug 210. As another example, a replaceable plug interface 291 may allow for the use of more expensive materials for plug interface 291 (such as harder or more damage-resistant materials) without having to use such expensive materials throughout the remainder of the valve plug 210. As another example, a replaceable plug interface 291 may allow for the use of softer materials for plug interface 291 than are used in the valve plug 210. Softer materials in the plug interface 291 may allow for a better seal on a valve seat 211, but may deform and require replacement more often than harder materials. By using a replaceable plug interface 291, when the plug interface is deformed, it may easily be replaced without replacing or re-machining the entire valve plug 210.

In one embodiment, an integral or replaceable seat for a BPAV may be altered to tune the flow capacity through the valve. For example, a seat for a BPAV may be selected based on the desired pressure drop at the valve body and/or the desired effect on the valve plug. By manipulating the pressure drop and effect on the valve plug, sufficient force may be maintained on the valve plug (and valve stem) to keep the valve open and maintain fluid flow.

Figure 3A:
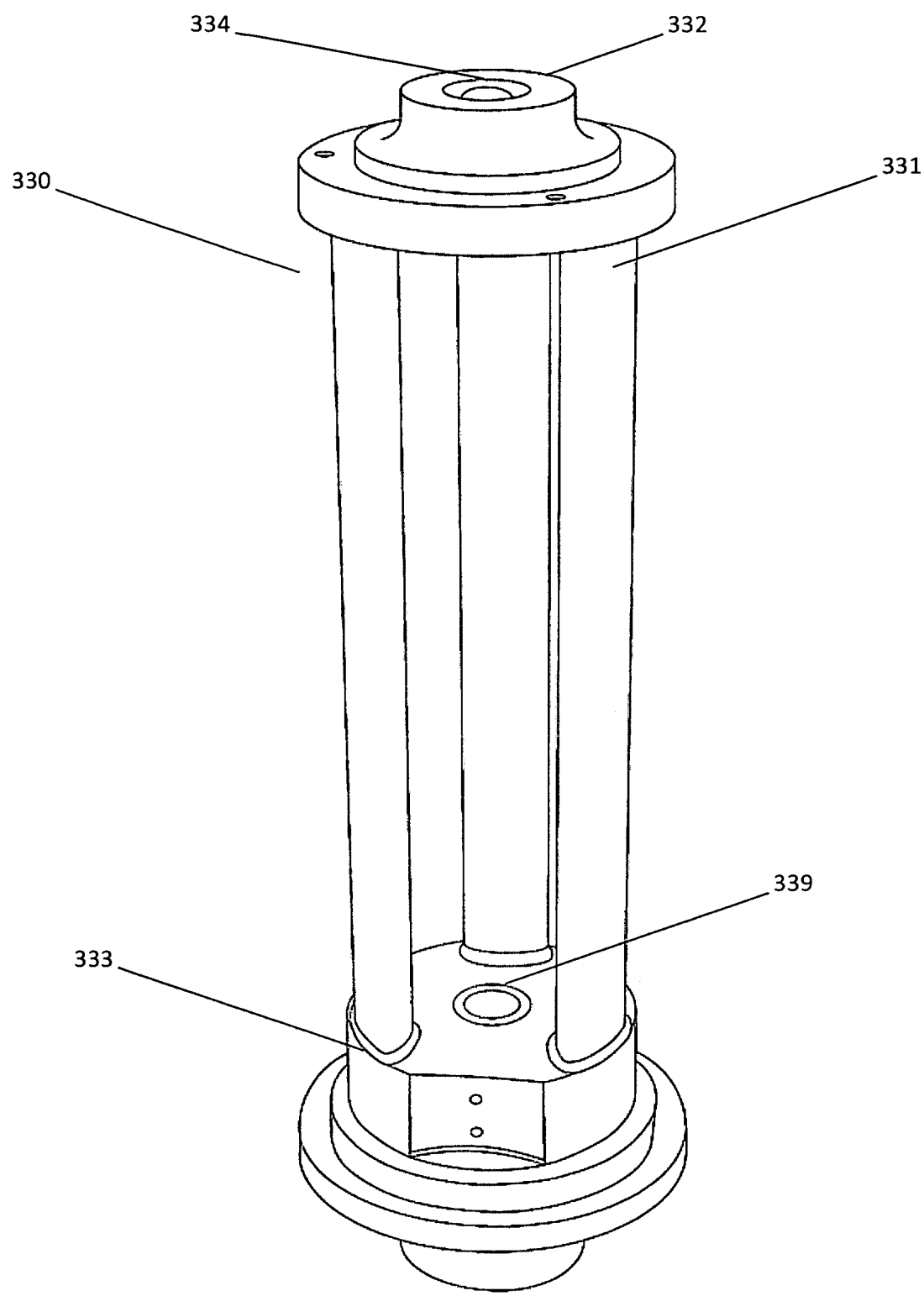
FIG. 3A depicts an all-in-one pin cage for a buckling pin actuated valve.
Figure 3B:
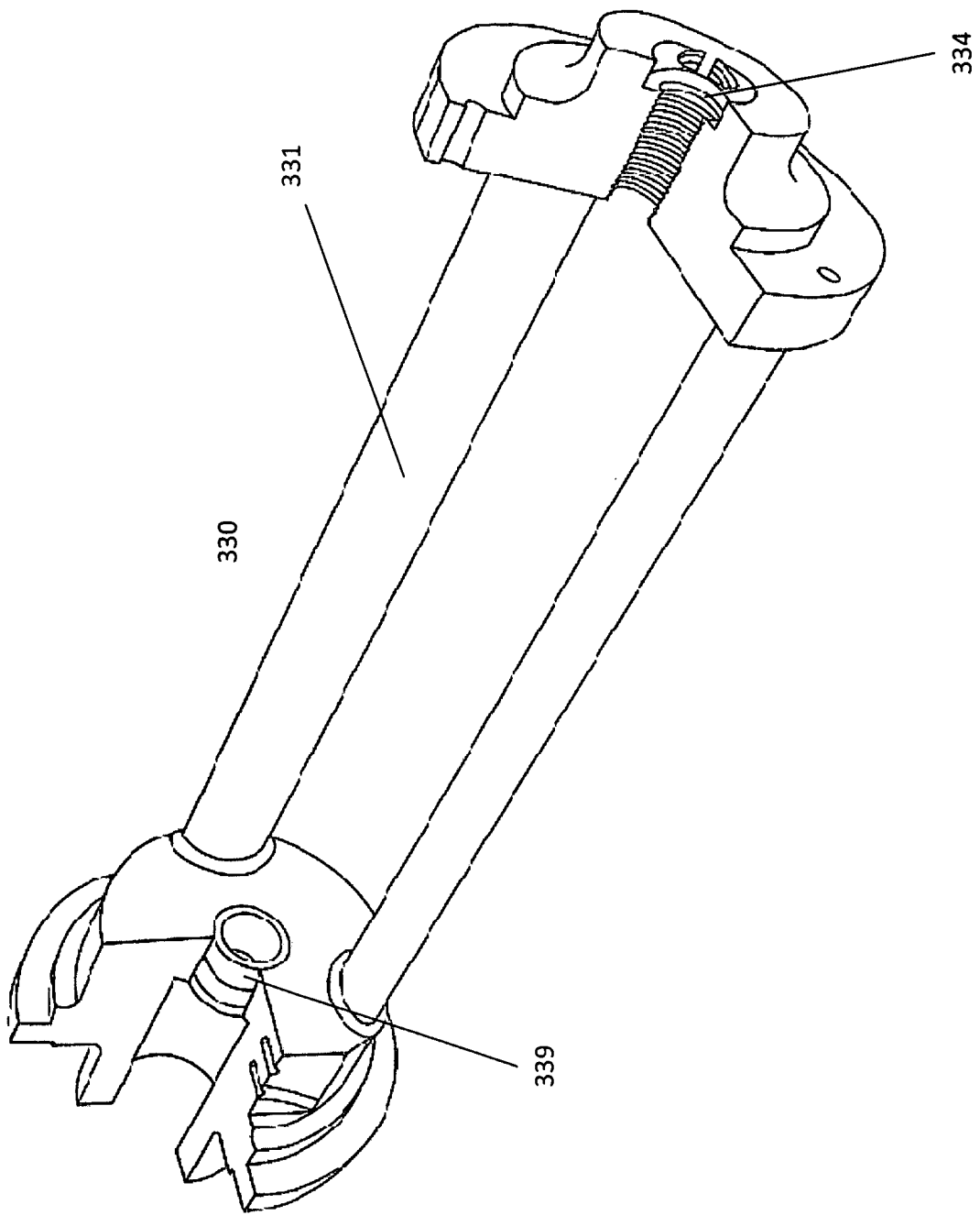
FIG. 3B depicts a partial-sectional view of an all-in-one pin cage for a buckling pin actuated valve.

In one embodiment, a BPAV may be provided with an "all-in-one" or integral pin cage 330, as illustrated in FIGS. 3A and 3B. The all-in-one pin cage 330 may be, for example, a cast component. An all-in-one pin cage 330 may simplify manufacturing of a pin cage, thereby saving costs. An all-in-one pin cage 330 may also provide rigidity to the system, which can improve alignment and reliability of a BPAV system. An all-in-one pin cage may be provided with an upper pin holding location 332 and a lower pin holding location 333 (joined by one or more posts 331) between which a buckling pin (not shown in FIGS. 3A and 3B) may be retained. The upper pin holding location may be machined to have a bore 334 for receiving a pin set screw or post (not shown in FIGS. 3A and 3B). The bore 334 in the upper pin holding location may be threaded. The lower pin holding location 333 may be provided with an insert 339 which may facilitate a pin piston (not shown in FIGS. 3A and 3B) sliding within a bore in the lower pin holding location 333. In one embodiment, the upper and lower pin holding locations 332, 333 can be machined together. Machining the upper and lower pin holding locations 332, 333 together may ensure increased accuracy in alignment, and may reduce manufacturing complexity and/or cost.

A prior art BPAV relies on a fabricated (e.g., by welding and/or by bolting) pin cage. In that prior art design, the pin cage may consist of two flanges attached a distance apart by studs bolted to the flanges. A prior art fabricated pin cage may suffer drawbacks in terms of alignment of the components. For example, each component of a fabricated pin cage may be dimensioned within certain tolerances. Once the components are assembled into a pin cage, the sum of the tolerances may result in a misaligned pin cage. In addition, the prior art fabricated design has inherent flexibility between the components, which may result in misalignment. Misalignment in a BPAV is undesirable, because it can reduce the pressure at which a buckling pin will fail, thereby resulting in diminished or unpredictable performance. Misalignment can also lead to damage in various BPAV components. For example, when the buckling pin collapses and the BPAV activates, the shaft may move at high speeds—when the valve plug comes unseated, in reaction to fluids flowing through the valve body, and as a consequence of deceleration when reaching the end of the shaft's stroke. If components are misaligned, high-speed movement of the BPAV shaft or other components can lead to bending or breaking. As a result, the BPAV may require replacement and/or may not be able to re-seal the valve plug and valve plug seat after sufficient pressure has been released or relieved from the pressure system.

Thus, compared to a prior art fabricated pin cage, the all-in-one pin cage 330 illustrated, for example, in FIG. 3A, can provide improvements in rigidity, accuracy, and alignment. In addition, an all-in-one pin cage may allow for easy assembly, increased repeatability, and decreased costs.

In one embodiment of a BPAV, a pin cage may be provided with variable-shaped posts. For example, as illustrated in FIG. 3A, a pin cage may be provided with non-circular posts 331. Such posts may be oval-shaped in cross-section (see FIG. 3B). Alternatively, such posts may be triangular-shaped in cross-section (see FIG. 3C), semi-arched in cross-section (see FIG. 3D), or rectangular or square in cross-section (FIG. 3E). Circular posts are also contemplated.

According to the present disclosure, the shape of the posts may be selected to improve rigidity. For example if a pin cage post is subject to shear forces or bending moments, the pin cage post may be widened in a direction to account for such shear forces or bending moments.

The shape of the posts may also, or alternatively, be selected to prevent the posts from obstructing the buckling pin after activation. When a BPAV activates, and a buckling pin collapses or breaks, it may be desirable to allow the collapsed or broken pin to move freely between the posts.

The shape of the posts may also, or alternatively, be selected to account for fluid and fluid flow to which the posts may be exposed. For example, the posts may be shaped to maximize fluid flow from the surface of the valve and/or around and through the pin cage. Specifically, the posts may be shaped to allow fluids to flow freely around the posts rather than pooling.

The shape and/or number of posts may also, or alternatively, be selected to account for access for installation and maintenance purposes.

Figure 4:
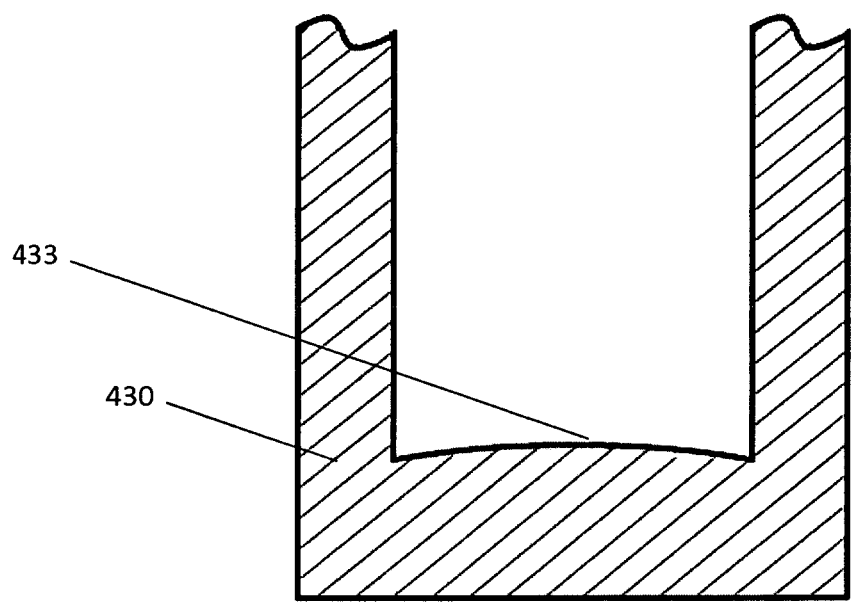
FIG. 4 depicts a pin cage for a buckling pin actuated valve with a sloped floor.

In one embodiment, illustrated in FIG. 4, a pin cage 430 may be provided with a lower surface 433—or "floor"—that is sloped to prevent build-up of fluid or debris on top of the valve components. In this way, the pin cage 430 may be designed to prevent build-up of debris that might inhibit activation of the buckling pin valve. Alternatively or additionally, a sloped pin cage floor 433 may prevent build-up of fluid that might freeze and inhibit activation of the buckling pin valve.

Returning to FIG. 1, in one embodiment, a protective sleeve 136 may be provided to surround the pin cage 130. A protective sleeve 136 may be attached to a pin cage using, e.g., screws 137. A protective sleeve 136 may be desirable to protect the buckling pin 120 or other components in the pin cage 136 from being contacted by personnel, wildlife, or the environment. For example, a protective sleeve 136 can prevent tampering or vandalism. As another example, a protective sleeve 136 may protect against environmental media corroding and/or icing up and/or otherwise impairing BPAV function.

A protective sleeve 136 may also be desirable to protect against the forces generated by pin 120 activation. For example, a protective sleeve 136 may ensure safety by preventing personnel from placing objects or body parts in the way of the buckling pin 120 or other moving components of the BPAV 100. Such moving parts may move with extreme speed and momentum, and may be extremely dangerous in the event of BPAV 100 activation. As another example, a protective sleeve 136 may prevent pieces of the BPAV 100, including pieces of the buckling pin 120, from escaping into the environment during or after activation.

In one embodiment, illustrated in FIG. 1, a BPAV has a shaft split into at least three pieces 110, 121, 122. The shaft pieces may be joined together in a manner that ensures axial loading (and eliminates non-axial loading) of the shaft and/or buckling pin 120. For example, a flexible connection may be provided between each shaft piece. The flexible connection may be a flexible two-way bearing ball coupling 123, 124. A BPAV provided according to this embodiment may allow for single point contact between a bearing ball and another shaft component, which may maximize the consistency of load transferral and may increase the accuracy of activation. Splitting the BPAV valve shaft into more than two pieces may achieve improved dynamic operation of the valve—e.g., during a fast-acting pressure release, upon a sudden stop after pressure release, and/or when subject to fluid flowing through the valve—without distortion of the shaft. This design may also further ensure axial pin loading and hence enhanced accuracy of activation pressure. This design may also allow for looser tolerances of other BPAV components. For example, a pin cage 130 and/or valve body 101 may be manufactured to looser tolerances when the shaft is split to accommodate such tolerances. A split shaft according to the present disclosure may also allow for the use of an energy absorber, as disclosed more fully below.

In one embodiment, a shaft may be split into three components: (1) a valve plug 110, (2) a balance disk 121, and (3) a pin piston 122. The valve plug 110 may seal with the valve plug seat 111 as described above. The balance disk 121 may slide within a bore of the pin cage 130. An O-ring 191 may be provided between the balance disk 121 and pin cage 130 to improve a seal between the two components.

The balance disk 121 may be provided to counteract (or balance) the effect of back pressures (acting within the valve body 101) acting on the back side of the valve plug 110. Such back pressures, if not accounted for, might adversely affect BPAV 100 performance by preventing the valve plug 110 from opening at the proper pressure. The pin piston 122 may be provided to transfer forces from the balance disk 121 to the buckling pin 120. An insert 139 within a bore in the lower pin mount 133 the pin cage 130 may be provided to facilitate the pin piston 122 sliding within the bore of the lower pin mount 133.

In one embodiment, the pin piston 110 and balancing disc 121 may be joined together with a flexible coupling 123. The pressure load may be transferred through the valve plug 110 and balance disc assembly 121 to the pin piston 122 by point contact—such as, for example, with a bearing ball on top of the balance disc (124). The pin piston may be attached to the bearing ball with a snap ring 125 in such a manner that under compression point contact is maintained with the bearing ball, but under tension, the pin piston 122 is able to lift the balance disc 125 and valve plug assembly 110 from the valve plug seat 111.

In another embodiment, a flexible connection 123 may be provided between the valve plug 110 and the balance disc 121. By way of example, the valve plug may be connected to the balancing disc via a ball joint 123 held in place by ball bearings in a groove. This design may give a flexible coupling between the valve plug 110 and balance disc 121. Providing a flexible connection between the valve plug 110 and balance disc 121 may allow for repeatable "breakout" friction between the valve plug 110 and its seat 111 by eliminating any effects of misalignment between the balance disc bore and the seating bore. Such a flexible connection may also allow the valve plug 110 to be reseated within its seat 111, even if the balance disk 121 and/or pin piston 122 are somewhat misaligned. Such a flexible connection may also make the connection between the plug 110 and balance disc 121 more secure by eliminating threaded connections that may come loose.

In one embodiment, a BPAV 100 may be provided with a sensor 140 configured to sense activation of the BPAV. For example, a proximity sensor may sense movement of a portion of the BPAV shaft. Using a proximity sensor, the movement of a shaft component may trigger a change in electrical circuit of either an NC/NO simple switch circuit or the output from an inductive switch. As another example, a BPAV shaft component can be fitted with a magnet configured to energize an NC/NO switch. In another embodiment, a BPAV shaft or shaft component may be provided with a metal component or components configured to trigger the response of an inductive switch circuit.

The foregoing sensors are exemplary only, and do not limit the present disclosure. The present disclosure contemplates the use of any suitable sensor that may sense the movement of one or more BPAV components. In addition, the present disclosure contemplates the use of other sensors that may sense BPAV activation, for example: a sensor to sense the breaking or deformation of a buckling pin, a sensor to sense the flow of fluids through the BPAV valve body, or a sensor to sense the pressure within the pressure system.

In one embodiment, a buckling pin may be provided as part of a pin cartridge system. In this manner, a buckling pin cartridge 150 may be installed within a pin cage 130, or otherwise installed in a BPAV 100. A pin cartridge system may minimize or reduce direct handling of buckling pins 120, which may eliminate damage that can be caused by such handling. A pin cartridge system may also minimize or reduce the possibility of pre-loading the buckling pin 120 too much during installation. A pin cartridge system is disclosed in co-owned U.S. Pat. No. 6,484,742, the entire contents of which are hereby expressly incorporated by reference.

A buckling pin cartridge 150 may also protect against the forces generated by pin activation. For example, a buckling pin cartridge 150 may ensure safety by preventing personnel from placing objects or body parts in the way of the buckling pin 120. A failing buckling pin 120 may move with extreme speed and momentum, and may be extremely dangerous in the event of BPAV activation. A buckling pin cartridge 150 may also prevent pieces of the buckling pin 120 from escaping into the environment during or after activation.

In one embodiment, a buckling pin valve may be provided with an energy absorber 126, which may be an energy absorbing material or component. The energy absorber 126 may, for example, be placed on top of a balance disc 121 and plug 110 assembly. The energy absorber 126 may reduce dynamic forces experienced by the plug 110 assembly when the buckling pin valve is activated. In one embodiment, the energy absorber 126 may be a piece of urethane, or a belleville spring, or disc spring. In another embodiment, the energy absorber 126 may be any suitable material or component that is capable of reducing the impact force experienced by the plug 110 assembly during the opening of the valve.

Using an energy absorber 126 according to the present disclosure may prevent damage to the coupling 123 between the plug 110 and balance disc 121 due to the impact forces experienced during valve opening. An energy absorber 126 may thus allow for repeated functioning of the stem assembly (110, 121, 122), thereby reducing or diminishing the need to replace, remanufacture, or repair the valve.

In one embodiment, an energy absorber 126 may be a deformable energy absorber. The energy absorber 126 may be configured to crush upon valve opening, but to minimize any rebound or bounce. Such a configuration may reduce the valve stem assembly (110, 121, 122) from being pushed into the flow of fluid being released from the valve. Such a reduction may avoid undesirably reducing fluid flow rates and may avoid damage to the valve stem assembly and/or other components.

In one embodiment, a rider band 127 may be provided. A rider band 127 is a narrow band of flat self-lubricating material, such as Teflon, that may assist with the smooth movement of the valve mechanism without adding significantly to the static and dynamic friction of the mechanism.

Figure 5:
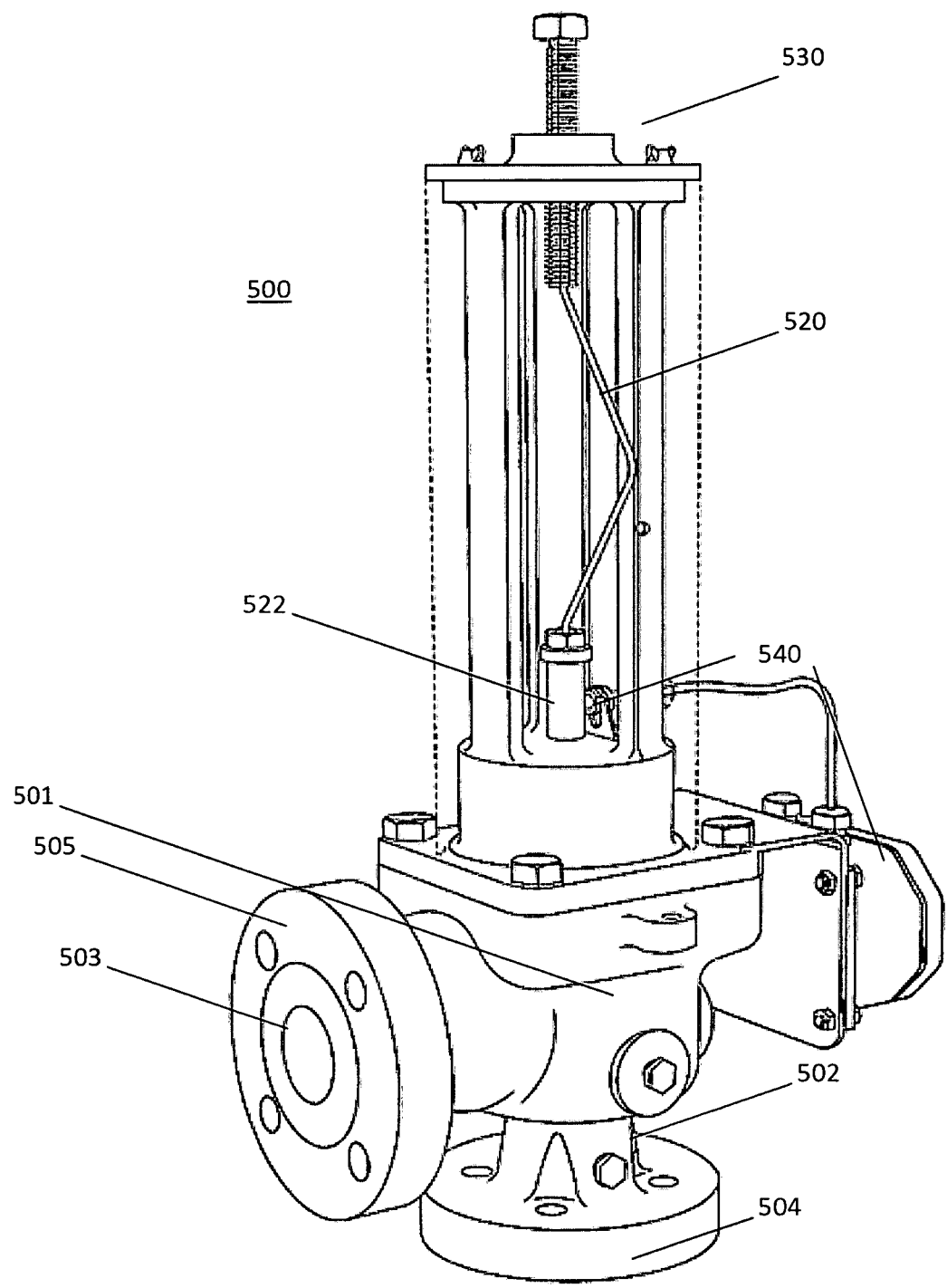
FIG. 5 depicts a buckling pin valve with a sensor.

FIG. 5 illustrates an assembled BPAV 500 in which a cast valve body 501 is bolted to an all-in-one pin cage 530. The valve body 501 has an inlet 502 with an inlet flange 504, and an outlet 503 with an outlet flange 505. The BPAV 500 of FIG. 5 includes a sensor 540 configured to sense the movement of a pin piston 522 in the event that buckling pin 520 activates and allows the pin piston 522 to move.

Figure 6:
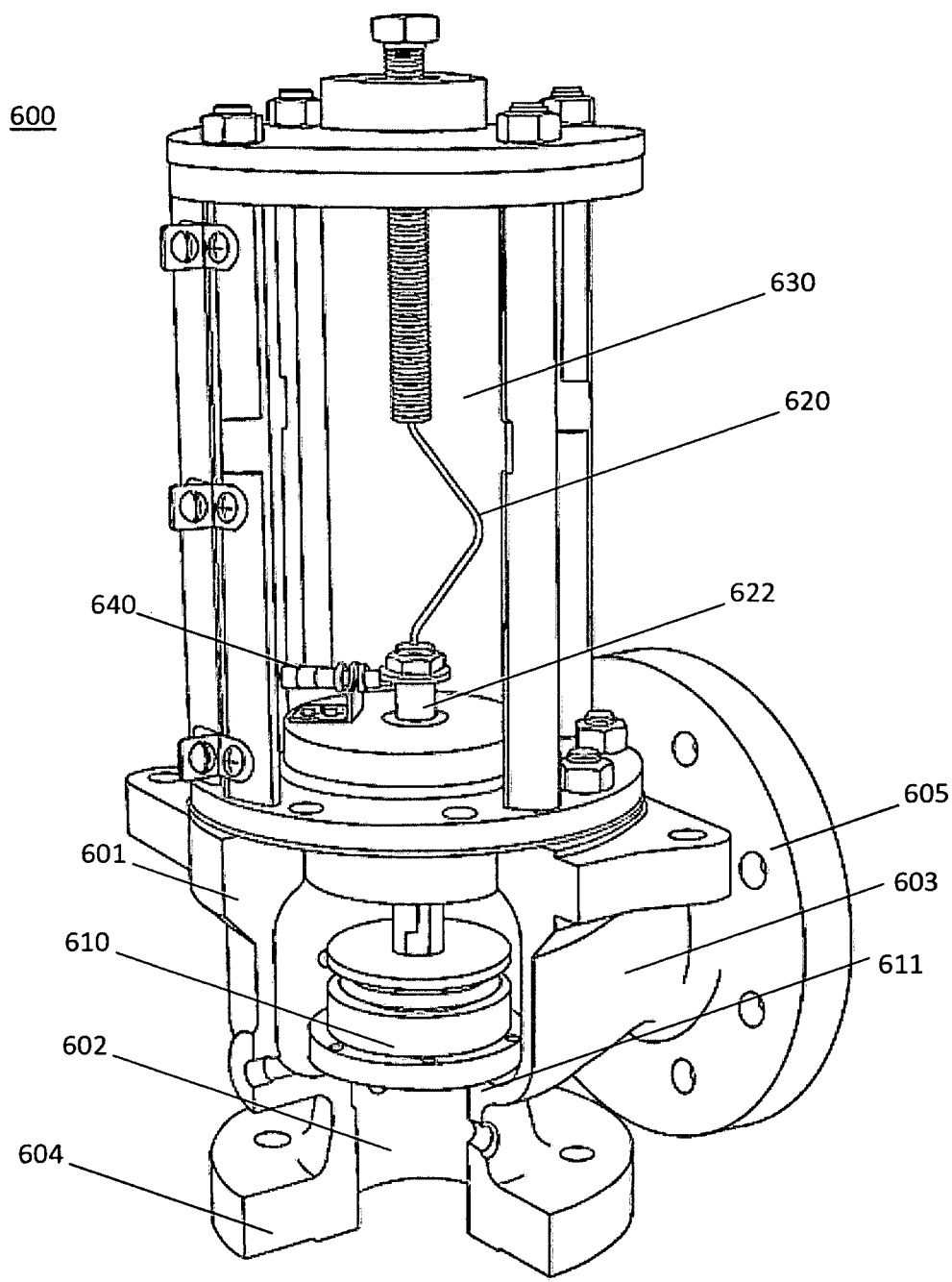
FIG. 6 depicts a buckling pin actuated valve in partial section, with a fabricated pin cage.

FIG. 6 illustrates an assembled BPAV 600 in which a valve body 601 is bolted to a fabricated pin cage 630. As illustrated, the valve body 601 has an inlet 602 with an inlet flange 604, and an outlet 603 with an outlet flange 605. The BPAV 600 of FIG. 6 includes a sensor 640 configured to sense the movement of a pin piston 622 in the event that buckling pin 620 activates and allows the pin piston 622 to move. As illustrated in FIG. 6, a valve plug 610 and a valve plug seat 611 are provided. The valve plug 610 and valve plug seat 611 are illustrated as having a face seal.

Figure 7:
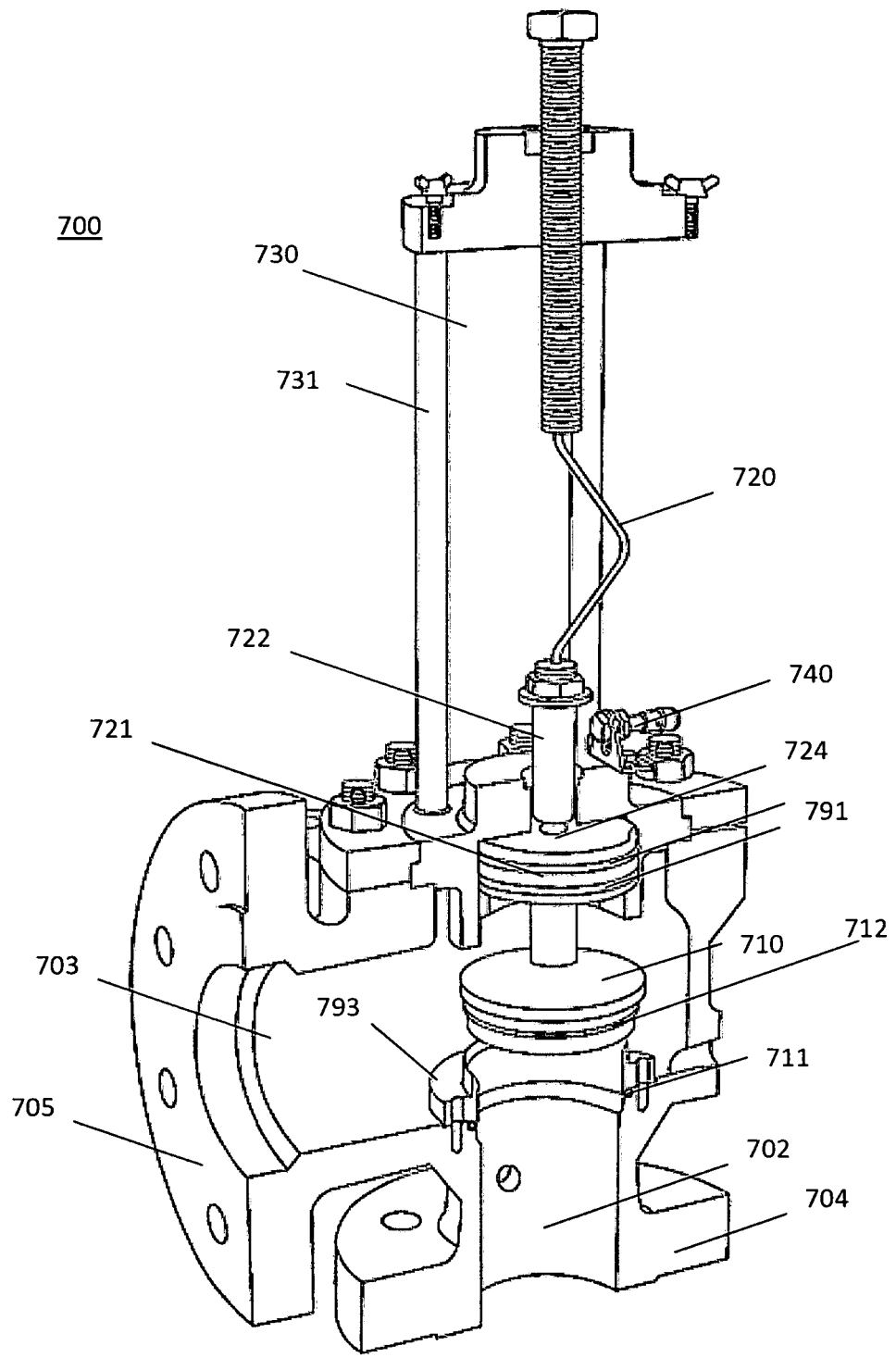
FIG. 7 depicts internal components of a buckling pin valve having a replaceable valve seat.

FIG. 7 illustrates an assembled BPAV 700 in which a valve body 701 is bolted to a pin cage 730. As illustrated, the valve body 701 has an inlet 702 with an inlet flange 704, and an outlet 703 with an outlet flange 705. A shaft comprising a valve plug 710, balance disk 721, and pin piston 722 is provided. A bearing ball connection 724 between the balance disk 721 and pin piston 722 ensure a point contact and transmission of axial force (without transmission of non-axial force) between the balance disk 721 and pin piston 722. As illustrated, the balance disk 721 is provided with two O-rings 791 to improve the seal between the balance disk 721 and a bore of the lower pin mounting surface 733 of the pin cage 730. Alternatively, a single O-ring 791 or more than two O-rings 791 may be used. The BPAV 700 of FIG. 7 includes a sensor 740 configured to sense the movement of a pin piston 722 in the event that buckling pin 720 activates and allows the pin piston 722 to move. As illustrated in FIG. 7, the valve plug 710 creates a piston seal with the valve plug seat 711. An O-ring 712 may be provided to improve the seal between the valve plug 710 and valve plug seat 711. In FIG. 7, the valve plug seat 711 is a replaceable valve plug seat. An O-ring may 793 may be provided between the replaceable valve plug seat 711 and the valve body 701.

A BPAV according to the present disclosure may meet API-526 piping configurations, and may be compatible with all major flange standards (ANSI/ASME-EN/DIN-JIS). According to the present disclosure, the set pressure of a BPAV may be independent of the back pressure experienced by the valve. A BPAV according to the present disclosure may be able to operate up to 90% of its set pressure without simmering. A BPAV according to the present disclosure may have a higher flow capacity than an equivalent sized standard relief valve.

While the above described embodiments of a buckling pin valve have been depicted as using a buckling pin, the disclosure is not necessarily intended to be limited to this particular structure. Therefore, alternative buckling pin systems are intended to be within the scope of this disclosure, including all equivalent activation mechanisms. For example, a spring, a Belleville spring, a bellows, a fusible link sensitive to temperature, or a memory metal component sensitive to temperature may be substituted for or used in addition to the buckling pin. Additionally, it is contemplated that individual features of one embodiment may be added to, or substituted for, individual features of another embodiment. Accordingly, it is within the scope of this disclosure to cover embodiments resulting from substitution and replacement of different features between different embodiments.

The above described embodiments and arrangements are intended only to be exemplary of contemplated systems and methods. Other embodiments will be apparent to those skilled in the art from consideration of the specification and practice of the disclosure herein.

What is claimed is:

1. A buckling pin actuated valve, comprising:
    a valve body having an inlet and an outlet;
    a valve seat at the valve body inlet;
    a valve plug configured to sealingly engage with the valve seat;
    a pin cage attached to the valve body and configured to mount a buckling pin, the pin cage having at least a top cap, a floor, and at least one post, wherein the pin cage is fabricated or machined from a single piece of material, and wherein the pin cage floor is sloped; and
    a shaft configured to transfer forces from the valve plug to the buckling pin.

2. The buckling pin actuated valve of claim 1, wherein the valve body is manufactured in an all-in-one integral construction.

3. The buckling pin actuated valve of claim 1, wherein the valve plug and the valve seat are configured to form a piston seal.

4. The buckling pin actuated valve of claim 1, wherein the valve seat is integrally formed within the valve body.

5. The buckling pin actuated valve of claim 1, wherein the valve seat is replaceable.

6. The buckling pin actuated valve of claim 1, wherein the valve plug comprises a valve plug interface, wherein the valve plug interface is replaceable.

7. The buckling pin actuated valve of claim 1, wherein the at least one post has a non-circular cross-section.

8. The buckling pin actuated valve of claim 1, wherein the at least one post has an oval cross-section.

9. The buckling pin actuated valve of claim 1, further comprising:
    a protective sleeve configured to surround the pin cage.

10. The buckling pin actuated valve of claim 1, wherein the shaft comprises at least a first flexible coupling and a second flexible coupling.

11. The buckling pin actuated valve of claim 10, wherein the shaft further comprises:
    a pin piston configured to transfer a force from the valve plug to a buckling pin;
    a balance disk configured to transfer a force from the valve plug to the pin piston;
    wherein the first flexible coupling is provided between the pin piston and the balance disk; and
    wherein the second flexible coupling is provided between the balance disk and the valve plug.

12. The buckling pin actuated valve of claim 10, wherein at least one of the first flexible coupling and second flexible coupling comprises a bearing ball.

13. The buckling pin actuated valve of claim 12, wherein the first flexible coupling comprises a bearing ball configured to maintain contact between the pin piston and the balance disk in response to a compressive force on the shaft.

14. The buckling pin actuated valve of claim 13, wherein the first flexible coupling is further configured to maintain contact between the pin piston and the balance disk in response to a tensile force on the shaft.

15. The buckling pin actuated valve of claim 10, wherein at least one of the first flexible coupling and second flexible coupling comprises ball bearings in a groove.

16. The buckling pin actuated valve of claim 1, further comprising:
    an energy absorber configured to absorb energy transmitted along the shaft in the event that the buckling pin actuated valve is actuated.

17. The buckling pin actuated valve of claim 16, wherein the energy absorber is one of a urethane energy absorber, a belleville spring, or a disc spring.

18. The buckling pin actuated valve of claim 16, wherein the energy absorber is positioned around the shaft.

19. The buckling pin actuated valve of claim 1, further comprising:
   a sensor configured to sense activation of the buckling pin actuated valve.

20. The buckling pin actuated valve of claim 1, wherein the pin cage is configured to receive a buckling pin cartridge.

21. The buckling pin actuated valve of claim 20, further comprising:
   the buckling pin cartridge.

22. A method of manufacturing a pin cage for a buckling pin actuated valve, comprising:
   fabricating a pin cage from a single piece of material, the pin cage comprising an upper plate and a lower plate;
   machining an upper buckling pin holding location in the upper plate simultaneously with machining a lower buckling pin holding location in the lower plate.

23. The method of manufacturing a pin cage of claim 22, wherein machining an upper buckling pin holding location in the upper plate further comprises tapping a threaded bore into the upper plate.

24. The method of manufacturing a pin cage of claim 22, wherein machining a lower buckling pin holding location in the lower plate further comprises boring a bore into the lower plate.

\* \* \* \* \*